H. L. SARVER.
AUTOMOBILE LIFT OR HOIST.
APPLICATION FILED JUNE 5, 1920.
1,369,194.
Patented Feb. 22, 1921.
2 SHEETS—SHEET 1.
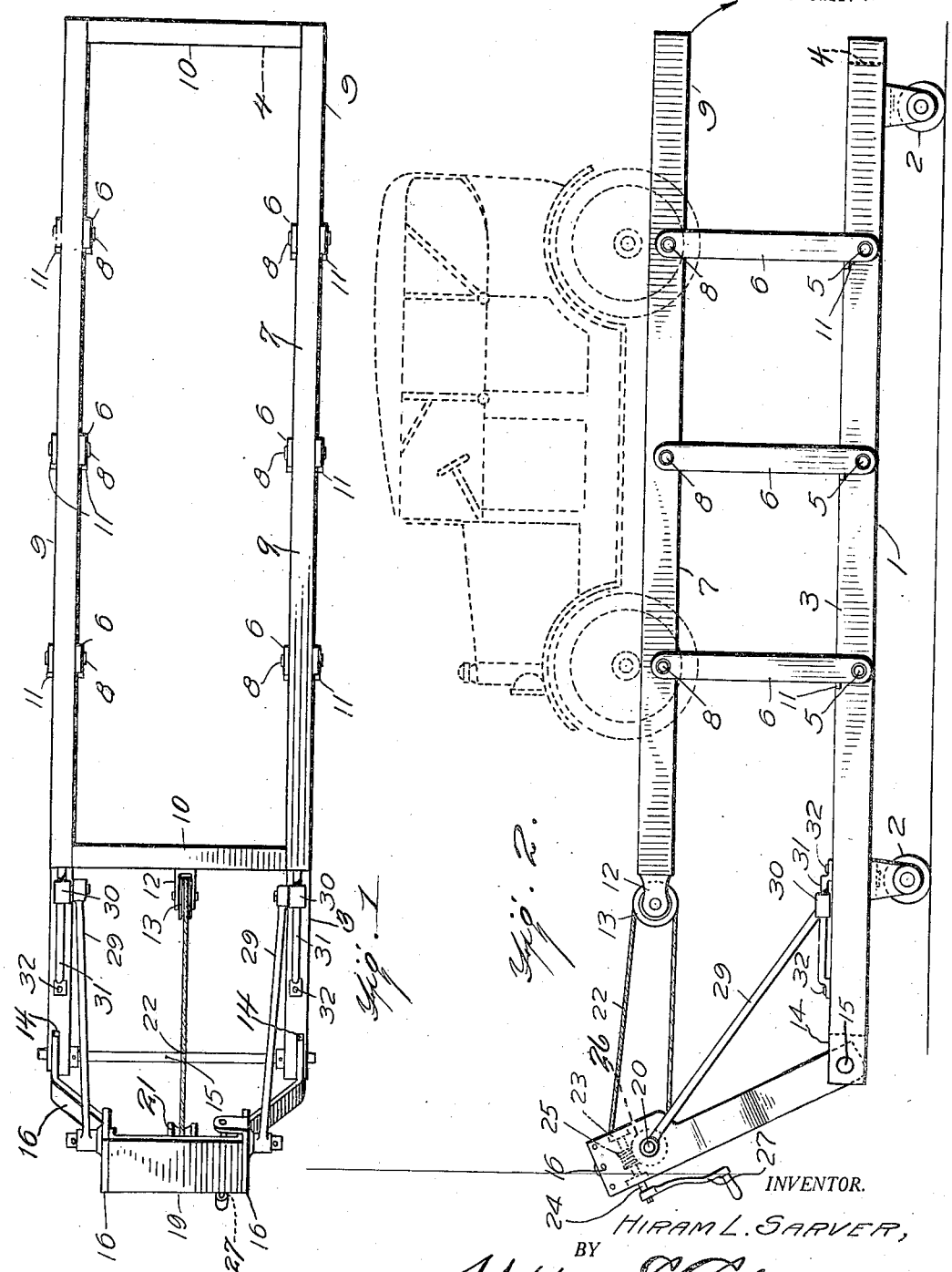
INVENTOR.
HIRAM L. SARVER,
BY
Watson E. Coleman
ATTORNEY.

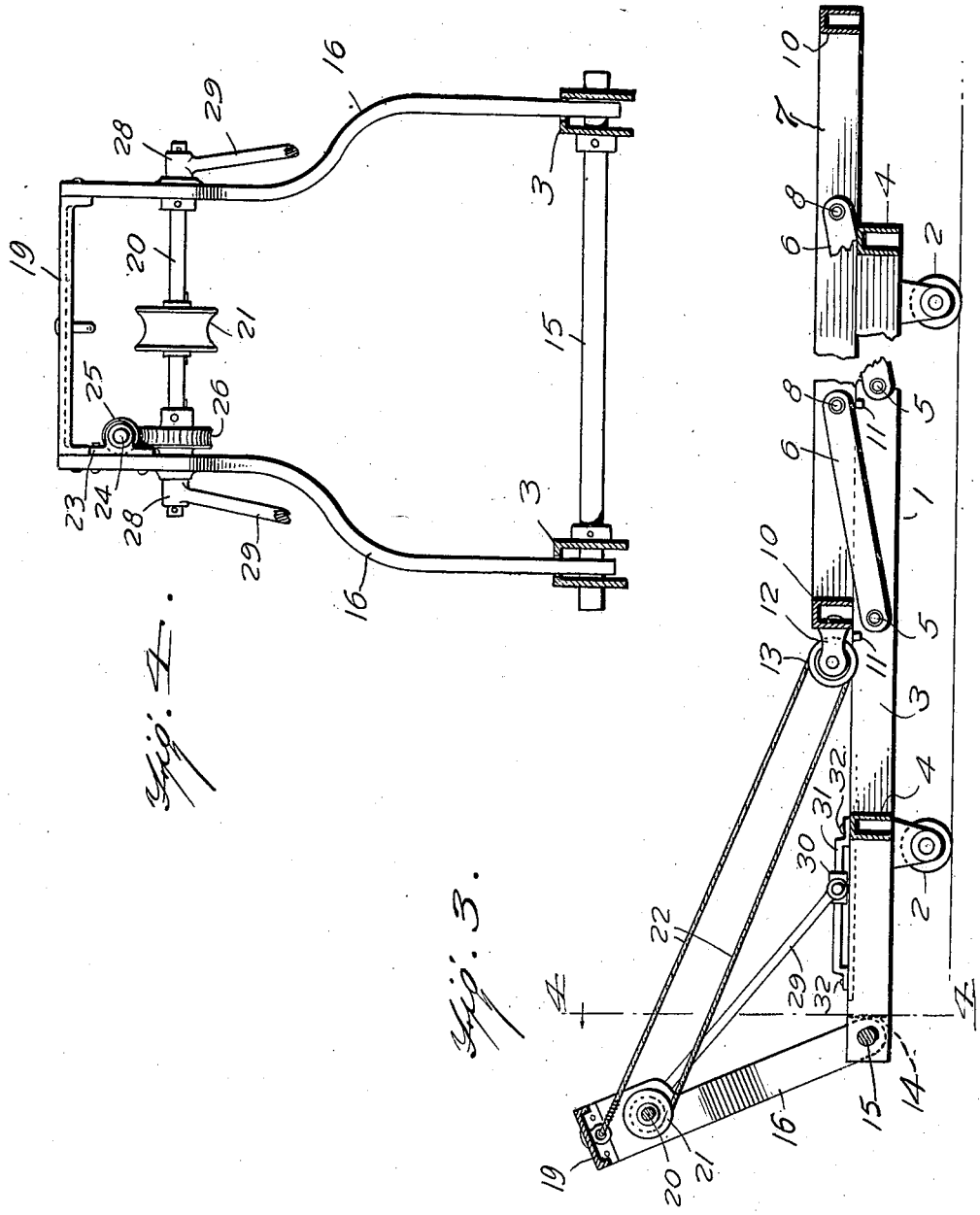

UNITED STATES PATENT OFFICE.

HIRAM L. SARVER, OF HERRICK, ILLINOIS.

AUTOMOBILE LIFT OR HOIST.

1,369,194.    Specification of Letters Patent.    Patented Feb. 22, 1921.

Application filed June 5, 1920. Serial No. 386,702.

*To all whom it may concern:*

Be it known that I, HIRAM L. SARVER, a citizen of the United States, residing at Herrick, in the county of Shelby and State of Illinois, have invented certain new and useful Improvements in Automobile Lifts or Hoists, of which the following is a specification, reference being had to the accompanying drawings.

This invention relates to an improved automobile lift or hoist and an object is to provide a device of this kind, particularly adapted for raising automobiles or other vehicles far enough off the ground or flooring of the garage to enable mechanics to work under the automobile when repairing the same.

Another object is to provide a device of this kind for raising and supporting an automobile off the ground or the flooring of the garage a short distance but far enough so as to prevent the tires from engaging with the flooring and thereby saving the tires. It is the aim to provide a device to lift the automobile or other vehicle bodily so that all four wheels of the vehicle are out of engagement with the ground or flooring of the garage.

Still another object is the provision of a device of this kind comprising a wheel supported portable base truck so that the apparatus is portable from one place to another, in combination with an automobile raising frame linked to the truck so as to collapse thereon when lowered and whereby when it is raised or in the act of rising, will lift or raise the automobile the required distance, either to permit a mechanic to work thereunder or repair the automobile or to hold the automobile with its wheels supported a short distance above the flooring of the garage to save the tires.

A further object is to provide a device of this character wherein means is provided for operating the frame, in other words, for raising and lowering the same, and holding the same in different adjusted positions.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts as will be hereinafter set forth, shown in the drawings and claimed.

In the drawings:

Figure 1 is a plan view of the lift,

Fig. 2 is a view in elevation showing the improved automobile lift constructed in accordance with the invention and showing the automobile in a hoisted position, Fig. 3 is a longitudinal sectional view, Fig. 4 is a transverse sectional view on line 4—4 of Fig. 1.

Referring to the drawings, 1 designates a truck frame which may be any suitable shape or configuration, preferably rectangular and is provided with supporting caster wheels 2, whereby the truck frame may be portable from one place to another. This truck frame comprises the longitudinal side beams 3 and the transverse beams 4. Pivotally mounted as at 5 on the sides of the longitudinal beams 3 and in pairs are supporting bars 6. The pairs on one side beam are in alinement with the pairs of bars on the other side beam and the bars of each pair are in registration, so that the entire set of bars may move in unison, when the automobile raising and supporting frame 7 is raised or lowered. The upper ends of the bars 6 are pivoted at 8 to the longitudinal side beams 9 of the automobile raising frame 7 which has transverse beams 10. In order to limit the automobile raising or lifting frame, the outer sides of the longitudinal beams 3 of the truck frame are provided with limiting stops 11 which are engaged by certain of the bars 6 so as to limit the automobile raising and supporting frame in its highest position and to prevent the bars from collapsing in the other direction.

A clamp 12 is carried by the forward end of the automobile raising or lifting frame and journaled in the arms of the clamp is a pulley 13.

The forward ends of the beams 3 are bifurcated as at 14 and passing through the ends is a pivot rod 15. Arms 16 are pivoted on the rod 15 in the bifurcations 14. Mounted in bearings of the arms 16 which are reinforced by the brace 19 is a shaft 20 on which a pulley 21 is mounted. A cable 22 is attached to the brace 19 and passes over the pulley 13 of the clamp or bracket 12 and has its other end attached to and wound about the pulley so that when rotating the shaft 20, the cable will be wound thereon and act to lift the automobile supporting frame. Brackets 23 are fixed to one of the arms 16 and mounted in bearings thereof is a shaft 24, on which a worm 25 is mounted. This worm meshes with a worm gear 26 which is mounted upon the shaft 20 so that when rotating the shaft 24 by means of a detachable crank handle 27, the shaft 20 may be rotated to wind the cable on the pulley.

Pivoted at 28 to the projecting ends of the shaft 20 are links or arms 29, which are in turn pivoted to sleeves 30 which are slidable upon guides 31 fixed at 32 to the end portions of the elongated beams 3 of the truck frame. By means of these sleeves 30 the arms or links are guided and by means of the arms or links, the arms 16 are reinforced.

In the operation, the automobile lifting or raising device is rolled to a position under the automobile whereby when the automobile supporting frame is raised, it will be in a position to engage the front and rear axles of the automobile as shown in dotted lines in the drawing. After positioning the lifting or raising device in such wise, the crank handle is attached to the shaft 24, and movement is imparted thereto. The cable is wound upon the drum or pulley thereby causing the automobile supporting frame to move upwardly relatively to the truck frame owing to the automobile frame being supported by the arms 6.

It will be noted that the automobile frame will move at all times in a plane horizontal to the truck frame and both ends of the automobile supporting frame will engage the front and rear axles of the automobile simultaneously and upon further rotation of the shaft 20, the automobile will be raised sufficiently to permit a mechanic or chauffeur or the like to work under the automobile for repairing the vehicle. By means of a worm and worm wheel drive for the shaft 24 it is unnecessary to employ a ratchet and pawl to hold the shaft 20 in different positions.

What is claimed is:—

1. In an automobile lifting and supporting device, a wheel supporting truck frame, an automobile lifting and supporting frame super-imposed relatively to the truck frame and being operatively connected thereto whereby it may move upwardly in a horizontal plane with respect to the truck frame, for raising and supporting an automobile, an oscillatory frame operatively mounted upon one end of the truck frame, reinforcing links connected to the oscillatory frame and having sleeves operatively and slidably connected with the truck frame, means connecting the oscillatory frame and the automobile supporting frame for raising and lowering the supporting frame to lift the automobile, whereby its wheels may disengage with the ground.

2. In an automobile lift, a truck frame, an automobile supporting and raising frame super-imposed relatively to the truck frame and being operatively connected therewith to move in a horizontal parallel plane with respect to the truck frame, an oscillatory frame mounted upon one end of the truck frame, a windlass carried by the oscillatory frame and including operative connections with the automobile supporting frame, for raising and lowering it whereby an automobile may be lifted to disengage its wheels from the ground.

3. In an automobile lift, a truck frame, an automobile supporting and raising frame superimposed relatively to the truck frame and being operatively connected therewith to move in a horizontal parallel plane with respect to the truck frame, an oscillatory frame mounted upon one end of the truck frame, a worm driven windlass carried by the oscillatory frame and including operative connections with the automobile supporting frame, for raising and lowering it whereby an automobile may be lifted to disengage its wheels from the ground, a pair of reinforcing arms pivotally mounted upon the ends of the shaft of the windlass mechanism, sleeves pivotally connected to the reinforcing arms, means carried by the truck frame for slidably supporting said sleeves, thereby reinforcing the oscillatory frame.

4. In an automobile lift, a truck frame, an automobile supporting and raising frame relatively super-imposed to the truck frame, parallel members operatively connecting the second frame with the truck frame, whereby the second frame may move in a horizontal parallel plane with respect to the truck frame, an oscillatory frame mounted upon one end of the truck frame, a windlass comprising a pulley and a shaft operatively connected with the automobile supporting frame for raising and lowering it whereby an automobile may be lifted to disengage its wheels from the ground, a member on the shaft of the windlass rotatable in a direction with the shaft and an element rotatable in a direction at right angles to the member and operatively engaging therewith for rotating the member and its shaft, said element and the member being so relatively disposed, whereby retrograde tension on the member, will fail to actuate the element, whereby it may prevent unwinding of the operative connections between the shaft and the automobile supporting frame.

5. In an automobile lift, a truck frame, an automobile supporting and raising frame relatively super-imposed to the truck frame, parallel means operatively connecting the second frame with the truck frame, whereby the second frame may move in a horizontal parallel plane with respect to the truck frame, an oscillatory frame mounted upon one end of the truck frame, movable braces connecting the third frame and the truck frame to relatively reinforce them, and a windlass carried by the frame and one end of the truck frame and operatively connected with the automobile supporting frame, for raising and lowering it, whereby an automobile may be lifted to disengage its wheels from the ground.

In testimony whereof I hereunto affix my signature.

HIRAM L. SARVER.